United States Patent
Zhong (10) Patent No.: US 11,438,500 B2
(45) Date of Patent: Sep. 6, 2022

(54) METHOD FOR CONTROLLING CAMERA MODULE, ELECTRONIC DEVICE, AND STORAGE MEDIUM

(71) Applicant: GUANGDONG OPPO MOBILE TELECOMMUNICATIONS CORP., LTD., Guangdong (CN)

(72) Inventor: Peng Zhong, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 17/331,566

(22) Filed: May 26, 2021

(65) Prior Publication Data

US 2021/0289129 A1  Sep. 16, 2021

Related U.S. Application Data

(63) Continuation of application No. PCT/CN2019/105425, filed on Sep. 11, 2019.

(30) Foreign Application Priority Data

Nov. 30, 2018  (CN) .......................... 201811457820.8

(51) Int. Cl.
*H04N 5/225* (2006.01)
*H04N 5/232* (2006.01)
(Continued)

(52) U.S. Cl.
CPC ......... *H04N 5/23219* (2013.01); *G06F 21/32* (2013.01); *H04M 1/0264* (2013.01)

(58) Field of Classification Search
CPC .. H04N 5/2251; H04N 5/2252; H04N 5/2253; H04N 5/2257; H04N 5/2258; H04M 1/0264
(Continued)

(56) References Cited

U.S. PATENT DOCUMENTS

2005/0014527 A1   1/2005  Chambers et al.
2020/0125707 A1*  4/2020  Lin ...................... H04N 5/2257

FOREIGN PATENT DOCUMENTS

CN  102045503 A  5/2011
CN  104038698 A  9/2014
(Continued)

OTHER PUBLICATIONS

Chinese First Office Action with English Translation for CN Application 201811457820.8 dated Sep. 29, 2019. (10 pages).
(Continued)

*Primary Examiner* — Anthony J Daniels
(74) *Attorney, Agent, or Firm* — Young Basile Hanlon & MacFarlane, P.C.

(57) ABSTRACT

The disclosure provides a method for controlling a camera module in an electronic device. The camera module is removable between a first position received in a body of the electronic device and a second position exposed from the body. The method includes: driving the camera module to slide to the second position in response to receiving a first face recognition request; maintaining the camera module in the second position for a first duration in response to acquiring a release request on the camera module; and driving the camera module to slide to the first position in response to not receiving a second face recognition request within the first duration.

20 Claims, 9 Drawing Sheets

(51) Int. Cl.
  *G06F 21/32* (2013.01)
  *H04M 1/02* (2006.01)
(58) Field of Classification Search
  USPC .................................... 348/373, 375, 376
  See application file for complete search history.

(56) References Cited

FOREIGN PATENT DOCUMENTS

| | | | |
|---|---|---|---|
| CN | 104918309 | A | 9/2015 |
| CN | 105554196 | A | 5/2016 |
| CN | 106856516 | A | 6/2017 |
| CN | 107259891 | A | 10/2017 |
| CN | 108196621 | A | 6/2018 |
| CN | 108471493 | A | 8/2018 |
| CN | 108804894 | A | 11/2018 |
| CN | 108810203 | A | 11/2018 |
| CN | 108829461 | A | 11/2018 |
| CN | 108833623 | A | 11/2018 |
| CN | 108833699 | A | 11/2018 |
| CN | 108834206 | A | 11/2018 |
| CN | 108845836 | A | 11/2018 |
| CN | 108897375 | A | 11/2018 |
| CN | 109246361 | A | 1/2019 |
| CN | 109547598 | A | 3/2019 |
| DE | 3713594 | C1 | 8/1988 |

OTHER PUBLICATIONS

International Search Report with English Translation for PCT Application PCT/CN2019/105425 dated Dec. 10, 2019. (22 pages).
Chinese Notice of Allowance with English Translation for CN Application 201811457820.8 dated Feb. 7, 2020. (8 pages).
Extended European Search Report for EP Application 19888545.1 dated Dec. 9, 2021. (7 pages).

* cited by examiner

METHOD FOR CONTROLLING CAMERA MODULE, ELECTRONIC DEVICE, AND STORAGE MEDIUM

CROSS-REFERENCE TO RELATED APPLICATION(S)

This application is a Continuation application of International Application No. PCT/CN2019/105425 filed on Sep. 11, 2019, which claims priority to Chinese Patent Application No. 201811457820.8 filed on Nov. 30, 2018, the entire contents of both of which are incorporated herein by reference.

TECHNICAL FIELD

The disclosure relates to the field of electronic technologies, in particular to a method for controlling a camera module, an electronic device, and a computer-readable storage medium.

BACKGROUND

With popularization of portable electronic devices such as smart phones, it may become major trends for optimization of aesthetics and functionality of the electronic devices. For example, improvement in a screen-to-body ratio of the electronic device may be one of popular trends.

In the related art, a front panel of the electronic device is provided with a camera module and other components, to provide a user with a front camera service. Therefore, contradiction between a ratio of an installation space of the camera module on the front panel and the improvement in the screen-to-body ratio needs to be resolved urgently.

SUMMARY

The disclosure in a first aspect provide a method for controlling a camera module in an electronic device. The camera module is removable between a first position received in a body of the electronic device and a second position exposed from the body. The method includes: driving the camera module to slide to the second position in response to receiving a first face recognition request; maintaining the camera module in the second position for a first duration in response to acquiring a release request on the camera module; and driving the camera module to slide to the first position in response to not receiving a second face recognition request within the first duration.

The disclosure in a second aspect provide an electronic device. The electronic device includes a body, a camera module removable between a first position received in the body and a second position exposed from the body, a memory, a processor electrically coupled to the memory, and a computer program stored on the memory and for running on the processor. The processor is configured to, execute the computer program on the memory to: drive the camera module to slide to the second position in response to receiving a first face recognition request; maintain the camera module in the second position for a first duration in response to acquiring a release request on the camera module; and drive the camera module to slide to the first position in response to not receiving a second face recognition request within the first duration.

The disclosure in a third aspect provide a non-transitory computer-readable storage medium with a computer program stored thereon. In response that the computer program is executed by a processor of an electronic device, the electronic device is caused to perform the method for controlling a camera module based on the above embodiments.

Additional aspects and advantages of the disclosure will be given in part in the following descriptions, become apparent in part from the following descriptions, or be learned from the practice of the disclosure.

BRIEF DESCRIPTION OF DRAWINGS

The above and/or additional aspects and advantages of the disclosure become obvious and easy to understand from the following description of the embodiments in combination with the accompanying drawings, in which.

DETAILED DESCRIPTION

Reference will be made in detail to embodiments of the disclosure. Examples of the embodiments are illustrated in accompanying drawings, in which the same or similar elements and the elements having same or similar functions are denoted by like reference numerals throughout the descriptions. The embodiments described herein with reference to drawings are explanatory, illustrative, and used to generally understand the disclosure. The embodiments shall not be construed to limit the disclosure.

In the description of the disclosure, it is to be understood that, terms such as "center", "longitudinal", "lateral", "length", "width", "thickness", "over", "below", "front", "back", "left", "right", "vertical", "horizontal", "top", "bottom", "in", "out", "clockwise", "anti-clockwise" refer to the directions and location relations which are the directions and location relations shown in the drawings, and for describing the disclosure and for describing in simple, and which are not intended to indicate or imply that the device or the elements are disposed to locate at the specific directions or are structured and performed in the specific directions, which could not to be understood to the limitation of the disclosure. In addition, terms such as "first" and "second" are used herein for purposes of description and are not intended to indicate or imply relative importance or significance. Furthermore, the feature defined with "first" and "second" may comprise one or more this feature distinctly or implicitly. In the description of the disclosure, "a plurality of" means two or more than two, unless specified otherwise.

In the disclosure, unless specified or limited otherwise, the terms "mounted," "connected," "coupled" and "fixed" are understood broadly, such as fixed, detachable mountings, connections and couplings or integrated, and can be mechanical or electrical mountings, connections and couplings, and also can be direct and via media indirect mountings, connections, and couplings, and further can be inner mountings, connections and couplings of two components or interaction relations between two components, which can be understood by those skilled in the art according to the detail embodiment of the disclosure.

In the disclosure, unless specified or limited otherwise, the first characteristic is "on" or "under" the second characteristic refers to the first characteristic and the second characteristic can be direct or via media indirect mountings, connections, and couplings. And, the first characteristic is "on", "above", "over" the second characteristic may refer to the first characteristic is right over the second characteristic or is diagonal above the second characteristic, or just refer to the horizontal height of the first characteristic is higher than the horizontal height of the second characteristic. The first characteristic is "below" or "under" the second characteristic may refer to the first characteristic is right over the second characteristic or is diagonal under the second characteristic, or just refer to the horizontal height of the first characteristic is lower than the horizontal height of the second characteristic.

Many different embodiments or examples are provided in the disclosure herein to implement different structures of the disclosure. To simplify the disclosure of the disclosure, the components and settings of specific examples are provided below. Of course, they are merely examples, and are not intended to limit the disclosure. Furthermore, reference numbers and/or letters may be repeated in different examples of the disclosure. Such repetitions are for simplification and clearness, rather than indicating the relations of the discussed embodiments and/or settings. Moreover, the disclosure provides examples of various specific processes and materials, but the applicability of other processes and/or application of other materials may be appreciated by those having ordinary skill in the art.

A method for controlling a camera module and an apparatus for controlling a camera module, provided in embodiments of the disclosure, may be described below with reference to the accompanying drawings.

In detail, in order to reduce an influence of hardware device(s) installed on a front panel of the electronic device such as a camera module on the screen-to-body ratio, the disclosure provides a sliding component. The camera module may slide out as needed and may be received in a body of the electronic device as not needed through a controlling of sliding of the sliding component. As a result, when functional services of components such as the camera module are not performed, the front panel of the electronic device is not occupied.

In detail, as illustrated in FIGS. 1 to 4, and 7, an electronic device 100 according to the embodiments of the disclosure may include a body 10, a sliding component 20 and a driving component 50. The sliding component 20 is configured to slide between a first position A received in the body 10 and a second position B exposed from the body 10. The driving component 50 is configured to drive the sliding component 20 to slide between the first position received in the body and the second position exposed from the body.

Figure 4:
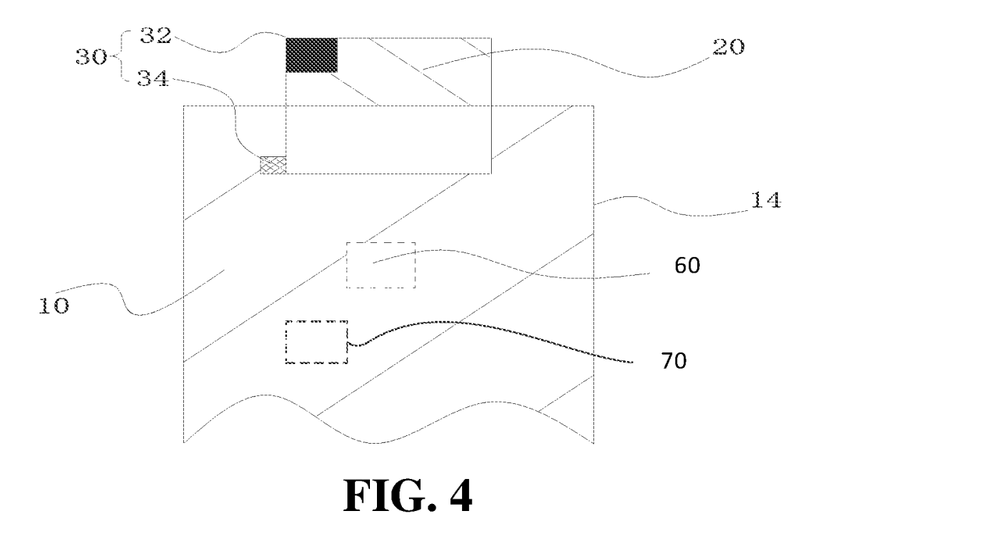
FIG. 4 is a schematic diagram of a structure of a detecting component according to embodiments of the disclosure.

Certainly, in order to make the driving component 50 know that the sliding component 20 slides to the corresponding position, the electronic device may also include the detecting component 30 for detecting the current position of the sliding component 20. In the embodiments of the disclosure, the detecting component 30 is configured to detect the position of the sliding component 20. The detecting component 30 includes a magnetic field generating element 32, a Hall element 34 and a processor 60. The magnetic field generating element 32 and the Hall element 34 are respectively fixed on the sliding component 20 and the body 10. The processor 60 is configured to receive a detection signal value output by the Hall element 34 and determine a current relative position of the sliding component 20 relative to the body 10 based on the detection signal value.

It is worth noting that "the magnetic field generating element 32 and the Hall element 34 are fixed on the body 10 and the sliding component 20 respectively" includes two situations. One is that the magnetic field generating element 32 is fixed on the body 10, and the Hall element 34 is fixed on the sliding component 20, the other is that the magnetic field generating element 32 is fixed on the sliding component 20, and the Hall element 34 is fixed on the body 10. In addition, the magnetic field generating element 32 and the Hall element 34 may be placed relative to each other in the vertical direction, or may be placed relative to each other in the horizontal direction. In other words, as long as the magnetic field generating element 32 and the Hall element 34 can generate relative motion, the specific positions of the magnetic field generating element 32 and the Hall element 34 are not restricted.

In some embodiments, the body 10 is formed with a sliding groove 16, and the sliding component 20 is received in the sliding groove 16 when at the first position A. In this way, the sliding component 20 is made to slide between the first position A and the second position B through the sliding groove 16.

In detail, the body 10 includes a housing 12 and a displaying component 14, and the housing 12 and the displaying component 14 are combined to form a closed structure. The sliding groove 16 is opened on the housing 12 so as to realize sliding-in and sliding-out of the sliding component 20. It is understood that the sliding groove 16 is opened on any side of the housing 12. Preferably, the sliding groove 16 is opened on the top edge of the housing 12, which conforms to the users' usage habits.

The displaying component 14 includes a touch panel (not illustrated) and a cover plate 142. The touch panel includes a displaying module (not illustrated) and a touch layer (not illustrated) provided on the displaying module. The displaying module is, for example, a liquid crystal display (LCD) Module (LCM). Certainly, the displaying module may be a flexible displaying module. The touch layer is configured to receive an input through touch from the user to generate a signal for controlling the content displayed in the displaying module and a signal for controlling the sliding of the sliding component 20.

The material of the cover plate 142 may be made of transparent materials such as glass, ceramics or sapphire. Since the cover plate 142 is configured as an input part of the electronic device 100, the cover plate 142 is often contacted by collisions or scratches. For example, when the user puts the electronic device 100 in the pocket, the cover plate 142 may be scratched and damaged by keys in the user's pocket. Therefore, the material of the cover plate 142 may be a material with a relatively high hardness, such as sapphire. Or, a hardened layer is formed on the surface of the cover plate 142 to improve a scratch resistance of the cover plate 142.

The touch panel and the cover plate 142 are bonded and fixed together, for example, by Optically Clear Adhesive (OCA). The OCA not only adheres and fixes the touch panel and the cover plate 142, but also may emit light from the touch panel.

Figure 5:
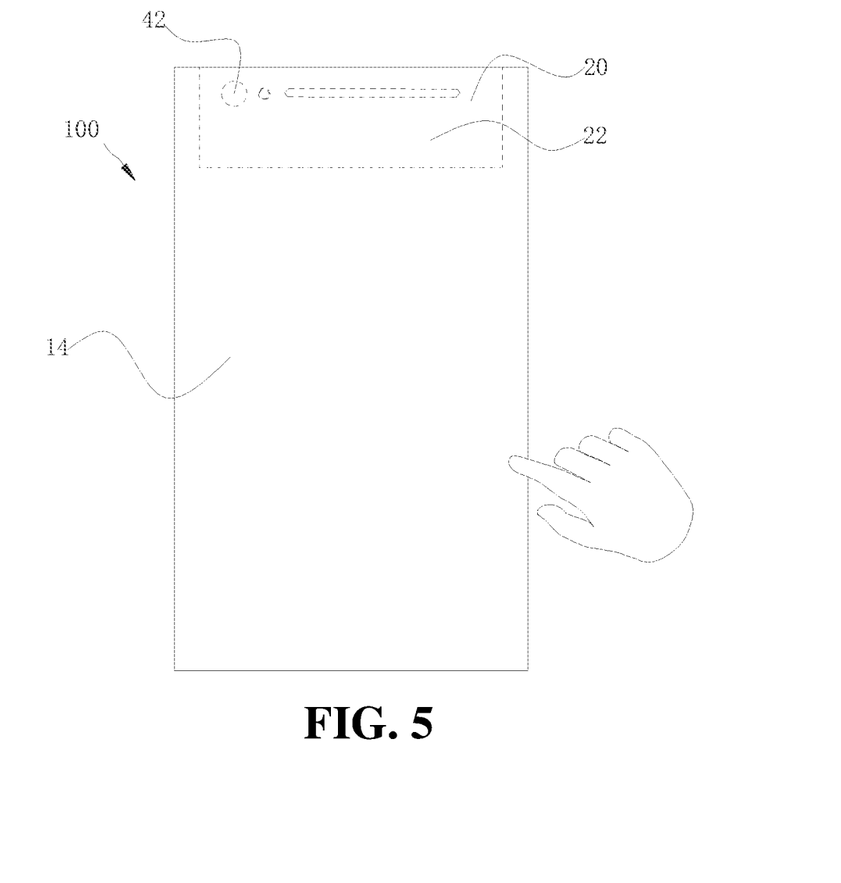
FIG. 5 is a diagram of a usage scene of an electronic device according to embodiments of the disclosure.

In order to more clearly illustrate the function of the sliding component 20 in the embodiments of the disclosure, referring to FIG. 5, in some embodiments, the electronic device 100 includes a camera module 42, the sliding component 20 includes a carrier 22, and the camera module 42 is provided on the carrier 22. In this way, the camera module 42 slides along with the sliding component 20. Certainly, the user turns on the camera module 42 and turns off the camera module 42 as trigger signals, that is, when the user turns on the camera module 42, the sliding component 20 is triggered to slide out, and when the user turns off the camera module 42, the sliding component 20 is triggered to slide back. In this way, the user only needs to turn on or off the camera module according to the existing habits, and does not need to perform additional operations on the sliding component 20, which is convenient for the user to use.

Figure 1:
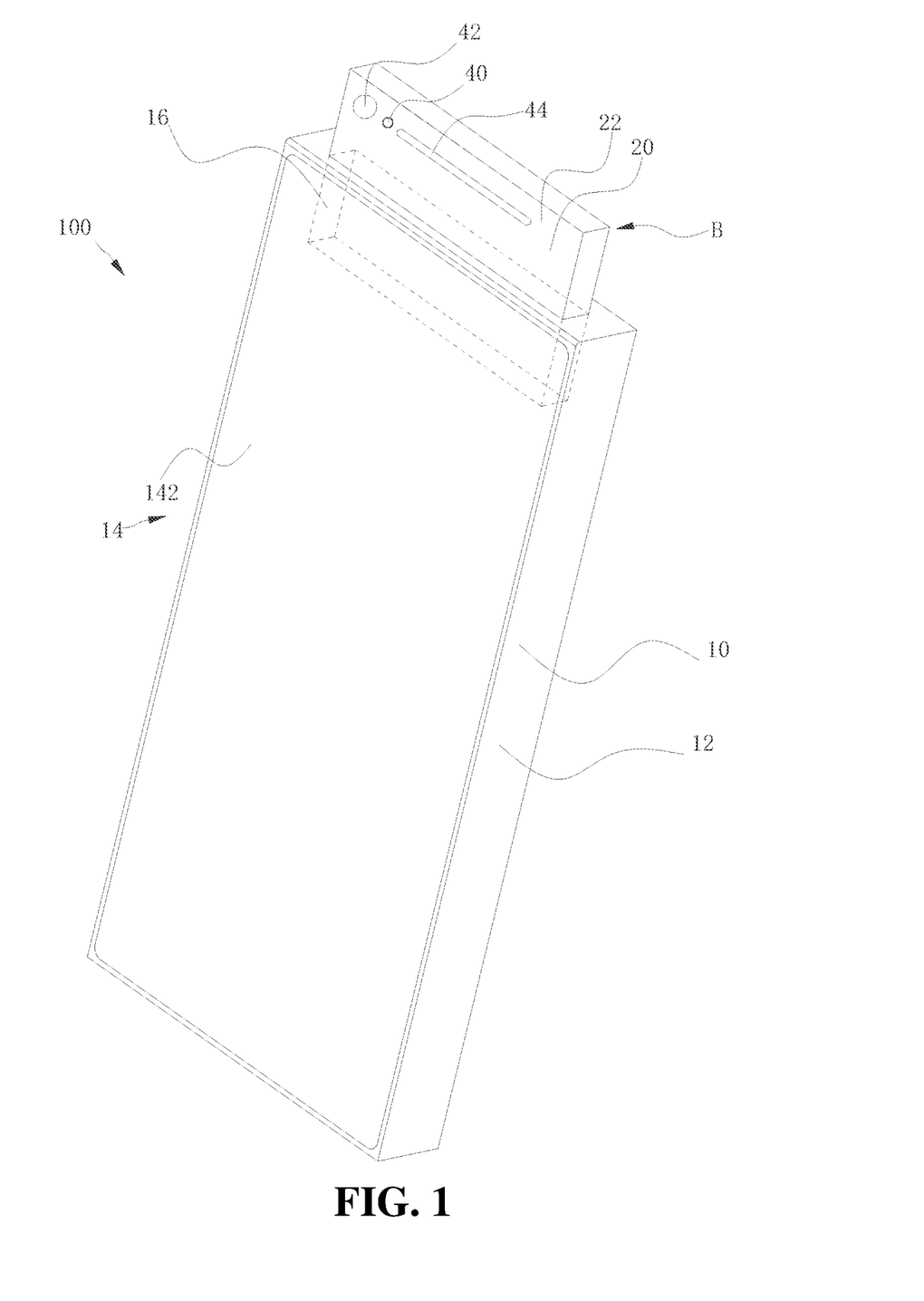
FIG. 1 is a schematic diagram of a state of an electronic device in a second position according to embodiments of the disclosure.
Figure 2:
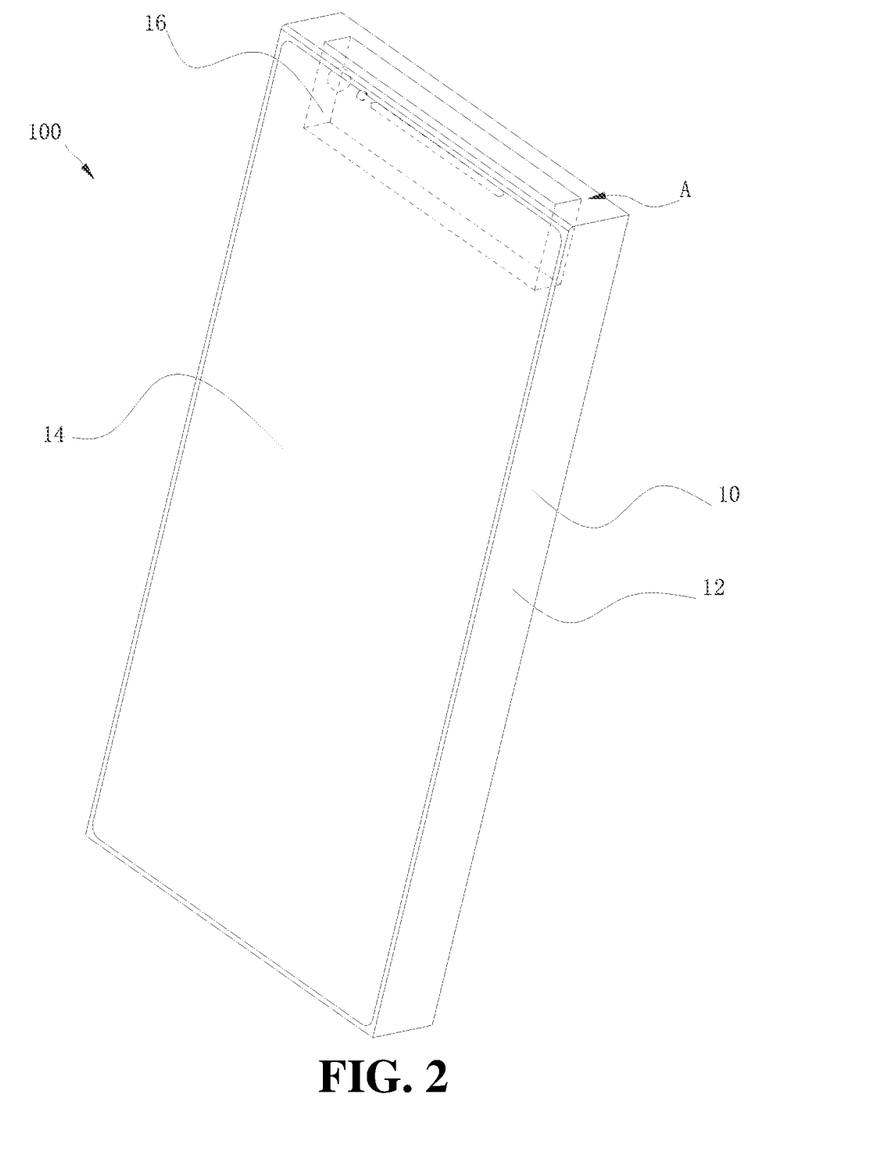
FIG. 2 is a schematic diagram of a state of an electronic device in a first position according to embodiments of the disclosure.
Figure 3:
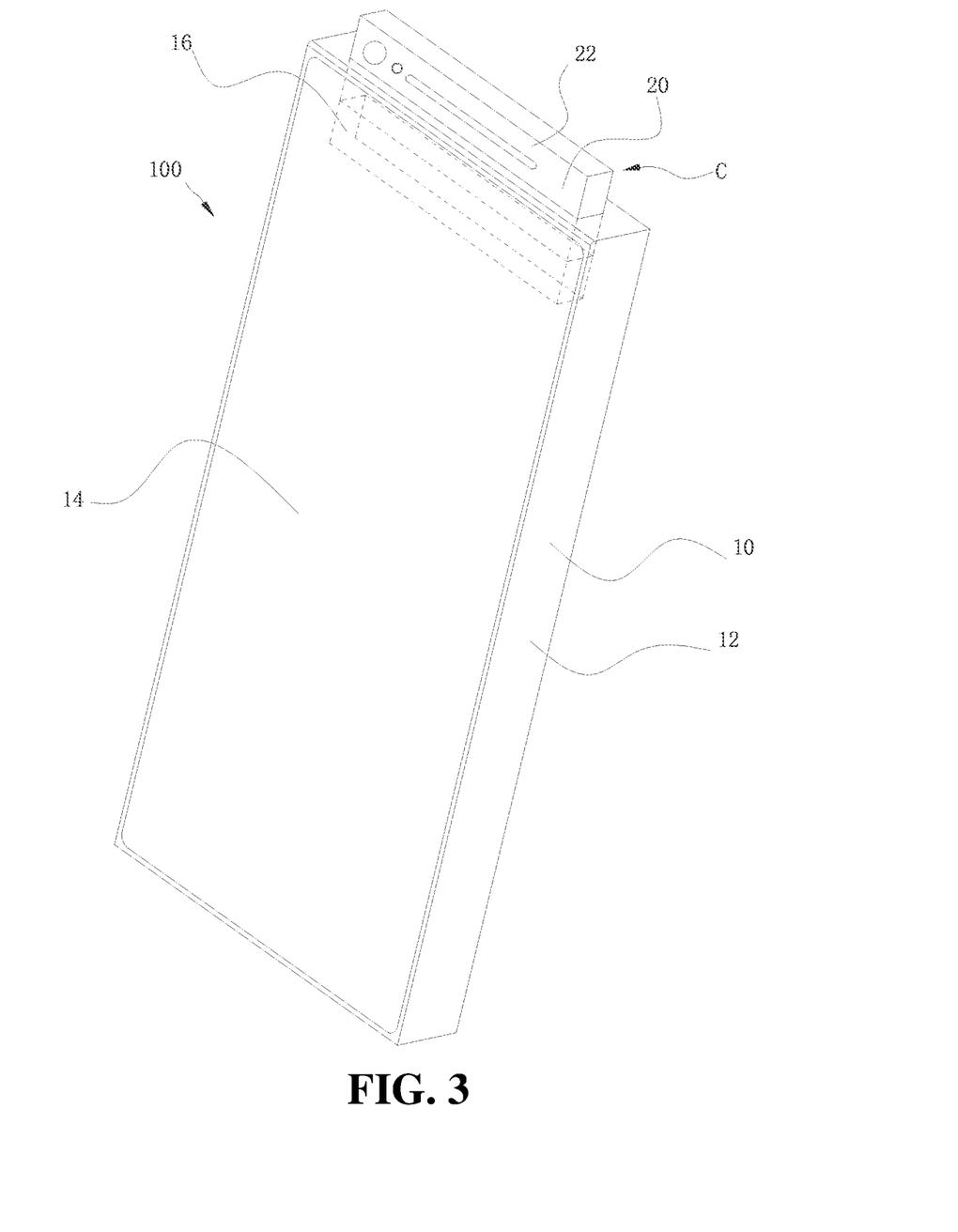
FIG. 3 is a schematic diagram of a state of an electronic device in a third position according to embodiments of the disclosure.

In addition to the camera module 42, other functional devices 40 may also be carried on the carrier 22, such as a light sensor, a proximity sensor and an earpiece 44, as illustrated in FIG. 1. These functional devices 40 may be exposed from the body 10 as the sliding component 20 slides out according to the input of the user, to work normally, or may be received in the body 10 as the sliding component 20 slides back according to the input of the user. In this way, the displaying component 14 is provided with as few through holes as possible, which is beneficial to satisfy the design requirements of the full screen of the electronic device 100.

In detail, when the light sensor is carried on the carrier 22, the light sensor is arranged on the top of the carrier 22, that is, when the sliding component 20 is completely received in the sliding groove 16, the light sensor is still exposed from the top of the carrier 22, so as to sense light in real time.

Figure 6:
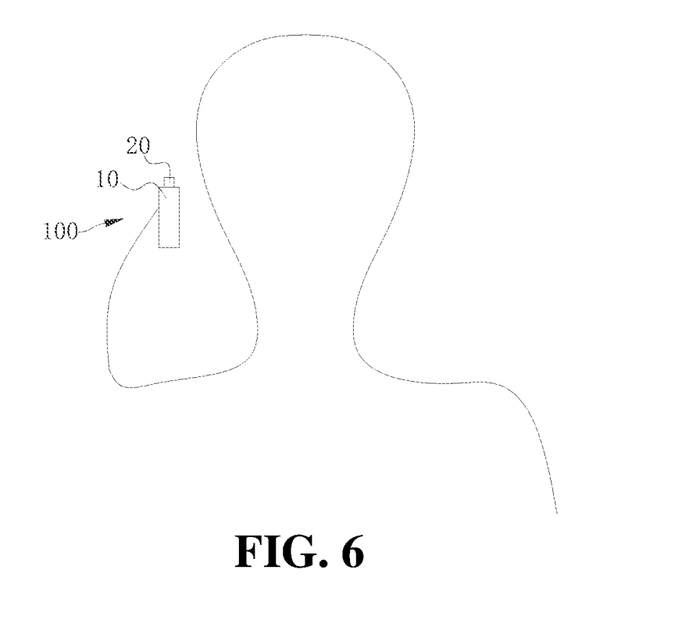
FIG. 6 is a diagram of another usage scene of an electronic device according to embodiments of the disclosure.

As illustrated in FIG. 6, when the carrier 22 carries the proximity sensor and the earpiece 44, the user may answer and hang up the call as trigger signals, that is, when the user answers the call, the sliding component 20 is triggered to slide out. When the user hangs up the phone, the sliding component 20 is triggered to slide back. In this way, the user only needs to answer or hang up the call according to the existing habits, and does not need to perform additional operations on the sliding component 20, which is convenient for the user to use.

It is understood that the plurality of functional devices 40 are carried on the same carrier 22 or on the plurality of carriers. When the plurality of functional devices 40 are carried on the same carrier 22, the plurality of functional devices 40 are arranged longitudinally, and the processor 60 controls the functional device 40 arranged at the lower part of the carrier 22 to expose by controlling a sliding distance of the sliding component 20. When the plurality of functional devices 40 are carried on the plurality of carriers 22, the processor 60 selects the functional device 40 to be exposed by controlling the sliding of a certain carrier 22.

Figure 7:
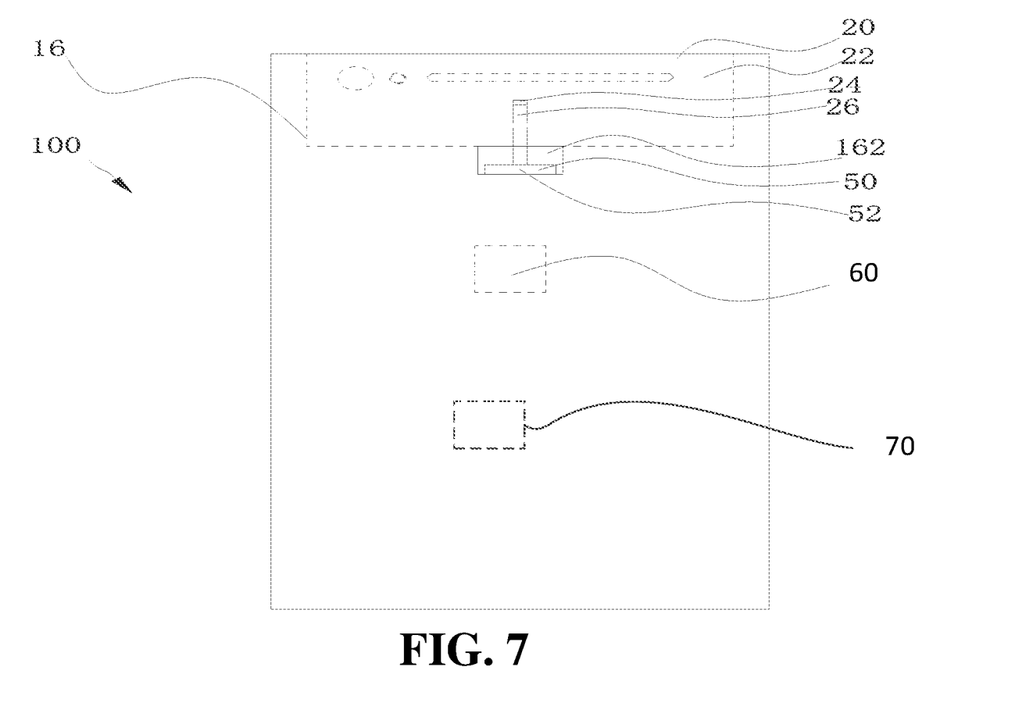
FIG. 7 is a schematic diagram of an electronic device according to embodiments of the disclosure.

As illustrated in FIG. 7, in some embodiments, the sliding component 20 includes a threaded hole 24 provided on the middle of the carrier 22 and a rotating screw 26 that cooperates with the threaded hole 24. The sliding groove 16 includes a groove 162 disposed opposite to the threaded hole 24 and located at the bottom of the sliding groove 16. The electronic device 100 includes a driving component 50 disposed in the groove 162. The driving component 50 includes a driving motor 52 coupled to the processor 60 and an output shaft (not illustrated) coupled to the bottom of the rotating screw 26.

It is understood that the processor 60 controls the sliding of the sliding component 20 by controlling the driving motor 52. When the user commands the sliding component 20 to slide from the first position A to the second position B, the processor 60 controls the driving motor 52 to rotate forward, so that the output shaft drives the rotating screw 26 to rotate in the threaded hole 24, thereby causing the sliding component 20 to slide from the first position A to the second position B. When the user commands the sliding component 20 to slide from the second position B to the first position A, the processor 60 controls the driving motor 52 to reverse, so that the output shaft drives the rotating screw 26 to rotate in the threaded hole 24, thereby causing the sliding component 20 to slide from the second position B to the first position A. It is noted that "from the first position A to the second position B" and "from the second position B to the first position A" herein refer to the sliding direction, rather than the start and end of sliding.

The electronic device 100 of the embodiments of the disclosure employs the Hall element 34 and the magnetic field generating element 32 to determine the current relative position of the sliding component 20. When the functional devices 40 such as the front camera are carried on the sliding component 20, the state of the sliding component 20 is detected in real time, thereby determining the position of the functional devices 40.

It is understood that the functional devices 40 such as the camera module 42 need to be exposed from the body 10, otherwise the functional devices 40 may not work normally. The electronic device 100 of the embodiments of the disclosure carries the functional devices 40 on the sliding component, so that the functional devices 40 may be received in the body 10 when they do not need to work, and may be exposed from the body 10 along with the sliding component 20 when they need to work. In this way, there is no need to open a through hole on the displaying component 14 for exposing the functional devices 40 such as the camera module 42, thereby increasing the screen-to-body ratio and improving the user experience.

However, the service life of the driving component and the service life of the sliding component are limited. If the driving component and the sliding component are saved when operations are unnecessary, the service life of the driving component and the service life of the sliding component are greatly prolonged, and the user experience is improved. For example, users like to encrypt applications, such as WeChat. When the screen is turned off directly at WeChat, the first interface after the screen is successfully unlocked through face and turned on, is application encryption. At this time, face recognition is successful, a fall delay is set. If the application encryption does not request a face recognition service to hold the camera within the delay, the sliding component falls. However, since the WeChat application encryption needs to perform face recognition, the sliding component rises again. Therefore, the sliding component rises and falls multiple times in a short duration, which increases the loss of related components such as the sliding component.

In order to avoid this loss, the disclosure accurately recognizes the scene where the camera module is called multiple times in the short duration. For the operation of calling the camera module multiple times in the short duration, the call on the camera is released, and the sliding-in of the sliding component is delayed, which avoids multiple sliding-in and sliding-out control of the camera module in the short duration.

The method for controlling the camera module is described in detail.

Figure 8:
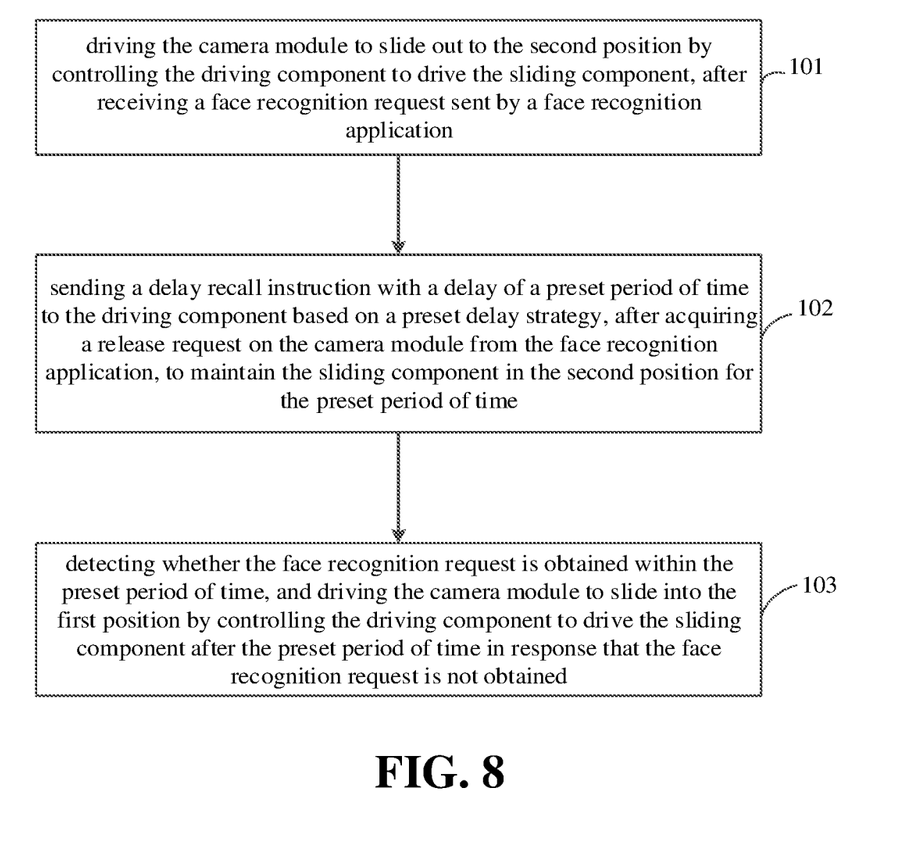
FIG. 8 is a flowchart of a method for controlling a camera module according to embodiments of the disclosure.

FIG. 8 is a flowchart of a method for controlling a camera module according to embodiments of the disclosure. As illustrated in FIG. 8, the method includes the following.

At block 101, the camera module is driven to slide out to the second position by controlling the driving component to drive the sliding component after receiving a face recognition request sent by a face recognition application.

When the face recognition application is launched, a call request on the camera module is sent. After receiving the request, the camera module is driven to slide from the first position to the second position by controlling the driving component to drive the sliding component, to provide face image collection services for the face recognition application.

It should be noted that the face recognition application in the embodiments of the disclosure may be any application that employs face encryption, including a file application that employs face encryption, WeChat application and a screen-locking application.

At block 102, a delay recall instruction with a delay of a preset duration is sent to the driving component based on a preset delay strategy, after acquiring a release request on the camera module from the face recognition application, to maintain the sliding component in the second position for the preset duration.

It is understood that after acquiring the release request on the camera module from the face recognition application, the sliding component does not slide immediately. However, based on the preset delay strategy, the delay recall instruction with the delay of the preset duration is sent to the driving component to maintain the sliding component in the second position within the preset duration. That is, in the embodiments of the disclosure, in order to avoid that there are continuous calls on the camera module from the face recognition applications in a short duration, after the previous face recognition application releases the call on the camera module, the sliding component does not slide immediately, to avoid receiving the face recognition request sent by the next face recognition application within the short duration after sliding in, and resulting in hardware loss when the sliding component slides in and out multiple times in the short duration.

The preset duration is calibrated based on a large amount of experimental data. Generally, within the preset duration, a scene in which two face recognition applications call the camera module is also covered within a moment. Certainly, in the embodiments, the preset duration is set according to the operation habits of the user. For example, if the user's operation habits are to check daily news after unlocking the mobile phone, and then enter the unlocking application of face encryption, the preset duration set for the electronic device by the user is long.

In actual implementation process, the applicant found that in the face recognition and unlocking process of the electronic device with the screen off, in addition to the face recognition service for controlling the sliding component, the screen-locking application directly controls the sliding component to slide in and out, which improves the service quality of the camera module, because the screen-locking application is informed prior to the face recognition module after the screen is turned on. Similarly, the screen-locking application is informed in advance when the sliding component slides in, so that it may be prior to the sliding component falling for the face recognition service or the recognition failure controlling the sliding component to keep rising. Therefore, when it is determined whether the face recognition application is a screen-locking application based on the application identifier of the face recognition application, the screen-locking application learns about control needs of the sliding component prior to the face recognition module. Therefore, a driving operation, of the screen-locking application, for controlling the driving component to drive the sliding component may be set, thereby improving the control efficiency of the sliding component and facilitating rapid sliding in and out of the sliding component.

Figure 9:
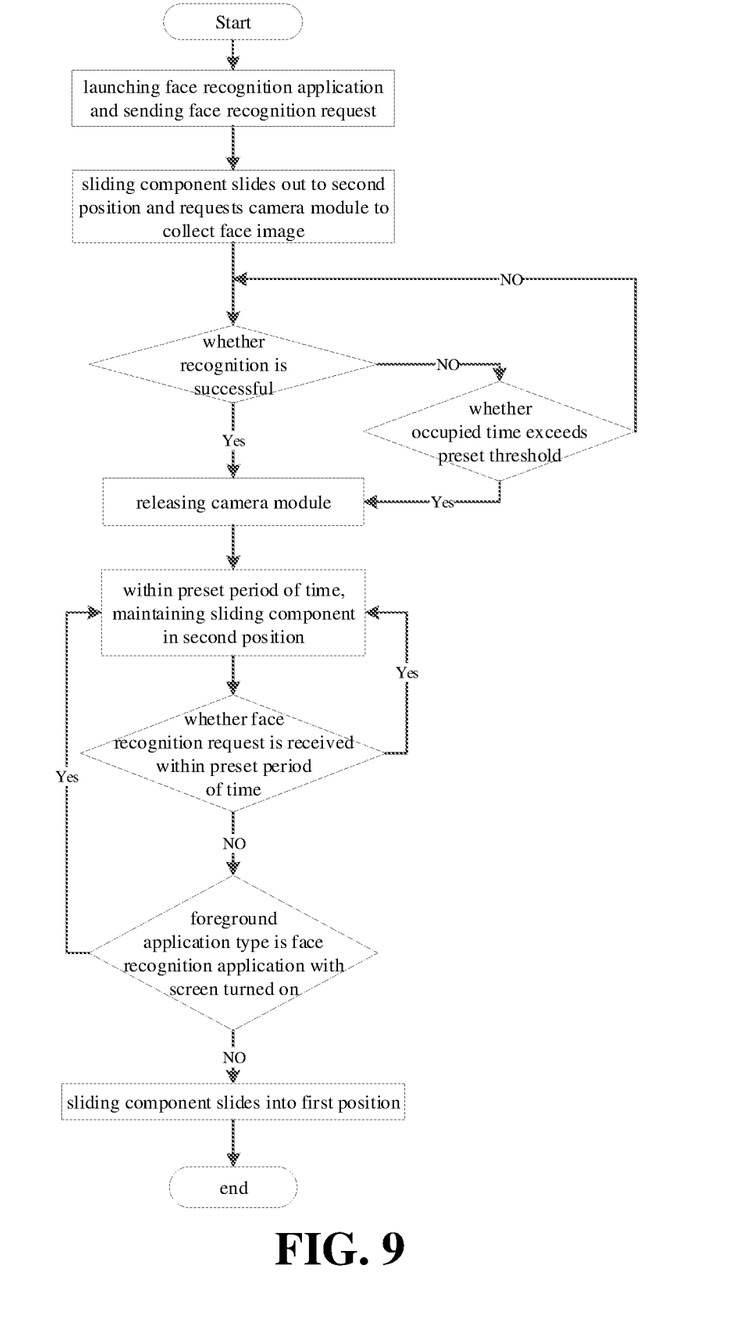
FIG. 9 is a flowchart of a method for controlling a camera module according to embodiments of the disclosure.

In embodiments, as illustrated in FIG. 9, there are two scenarios for acquiring the release request on the camera module from the face recognition application. The first is the face recognition success. At this time, the face recognition application releases the call on the camera module. The other is the face recognition failure. At this time, the reason of the face recognition failure may be that the corresponding face recognition application is stuck. In this case, in order to not affect the call on the camera module by other face recognition applications, when it is detected that a duration of the face recognition application occupying the camera module exceeds the preset duration, such as more than 30 seconds, or a number of face recognition failures exceeds the preset number, the face recognition application is forced to release the call on the camera module.

At block 103, it is detected whether the face recognition request is obtained within the preset duration, and the camera module is driven to slide into the first position by controlling the driving component to drive the sliding component after the preset duration in response that the face recognition request is not obtained.

In detail, within the preset duration, it is detected whether the face recognition request is obtained. In response that the face recognition request is obtained within the preset duration, the delay recall instruction is removed, so that the face recognition application that sends the face recognition request to the camera module may work normally.

In response that the face recognition request is not obtained within the preset duration, it indicates that there is no need to call the camera module, so that the sliding component is driven by controlling the driving component to drive the camera module to slide to the first position to avoid the camera module from sliding out for a long duration, so that waste of resources is caused and chances of collision are increased.

Certainly, in a possible implementation, when the application running in the foreground of the system is the face recognition application and the screen of the electronic device is turned on, the sliding component is remained in the second position, so as to minimize the loss of the sliding component as much as possible. In the embodiments, referring to FIG. 9, it is possible to determine whether the type of the application currently running in the foreground of the system is the face recognition type before controlling the driving component to drive the sliding component to drive the camera module to slide in the first position after the preset duration (for example, comparing the application identifier of the foreground application with the application identifier of the pre-stored face recognition application, and determining whether the type of the application currently running in the foreground of the system is the type of the facial recognition application based on the comparison result), or whether the screen of the electronic device is turned off. If it is determined that the type of the application currently running in the foreground of the system is not the type of the face recognition application within the preset duration, or the screen of the electronic device is turned off, the sliding component is driven to drive the camera module to slide to the first position. If it is determined that the type of the application currently running in the foreground of the system is the type of the face recognition application, and the screen of the electronic device is turned on, the sliding component is maintained in the second position for the preset duration in order to provide face recognition services for the relevant face recognition application at any time.

It should be noted that, in different application scenarios, the above ways of detecting whether the face recognition request is obtained within the preset duration are different. As a possible implementation, in the above embodiments, it is determined whether the real face recognition request is obtained. In another possible implementation, a counter is pre-created to record the request of the sliding component. An initial value of the counter is 0. After the face recognition request is obtained, the counter is incremented by one. After the release request on the camera module is received, the counter is decremented by one. It is obvious that when the count value of the counter is 0, it means that no face recognition application occupies the camera module at this time, and when the count value of the counter is 1, it means that the face recognition application occupies the camera module at this time. Therefore, it is possible to detect whether the face recognition request is obtained by determining whether the count value of the counter changes from zero to one within the preset duration.

Figure 10:
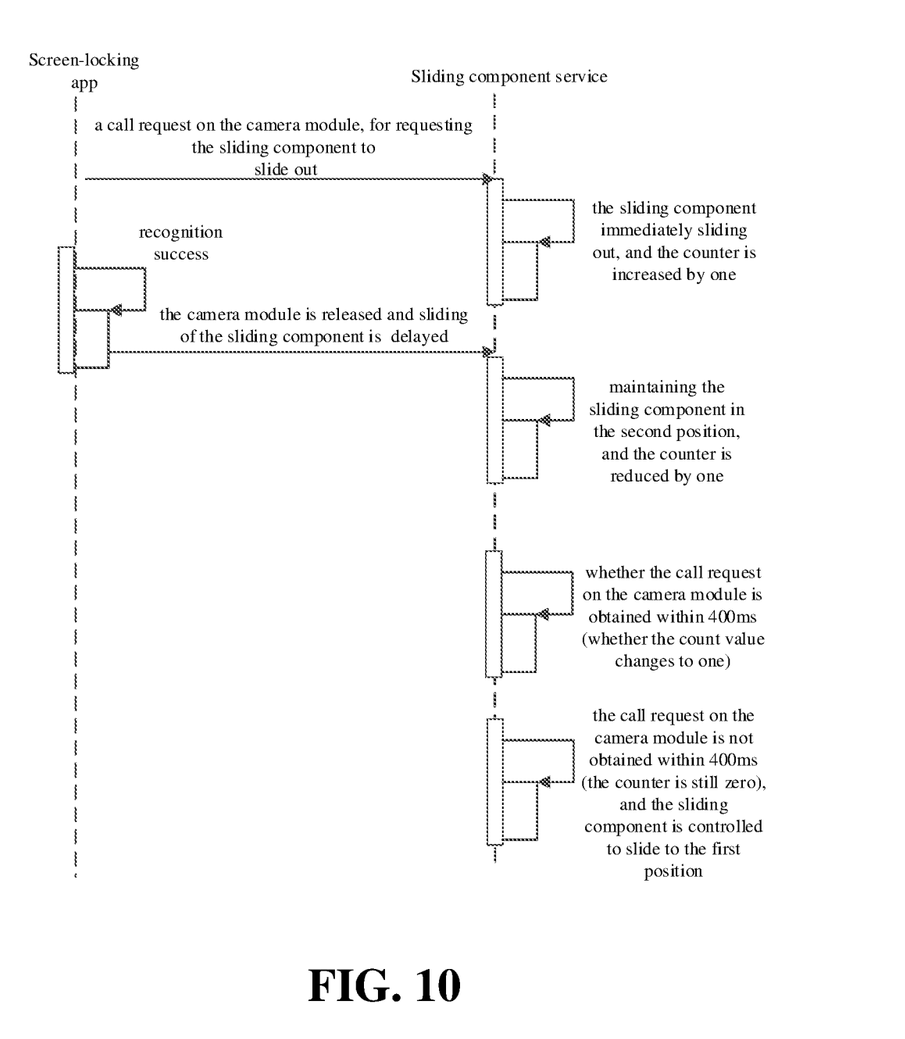
FIG. 10 is a flowchart of a method for controlling a camera module according to embodiments of the disclosure.

For example, as illustrated in FIG. 10, a counter for recording the request of the sliding component, is configured in advance. The initial value of the counter is 0. After receiving the call request of the screen-locking application on the camera module, the sliding component receives a sliding-out instruction. At this time, the sliding component drives the camera module to slide to the second position, and the count value of the counter is increased by one. After the screen-locking application releases the occupation of the camera module, the release request on the camera module sent by the camera module is received. Although a sliding-in instruction is received by the sliding component, the sliding in of the sliding component is delayed based on the preset delay strategy, but at this time the count value of the counter is reduced by one and becomes zero. When the count value of the counter is zero, within the preset duration (in this example, the preset duration is 400 ms), it is detected whether the face recognition request is obtained. If the face recognition request is not obtained, the count value of the counter is zero within 400 ms, and there is no situation of changing from zero to one. Therefore, the driving component is controlled to drive the sliding component to drive the camera module to slide to the first position after the preset duration.

In conclusion, with the method for controlling the camera module provided in the embodiments of the disclosure, the influence of related components on the screen-to-body ratio may be reduced through the sliding component, and the loss of the sliding component is reduced. When there is a control request for the camera module in a short duration, the camera module is maintained in a sliding-out state to avoid multiple operations of related components in the short duration, and the flexibility and practicability are high.

Figure 11:
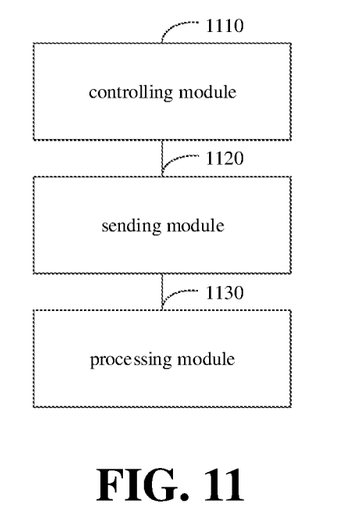
FIG. 11 is a block diagram of an apparatus for controlling a camera module according to embodiments of the disclosure.

In order to implement the above embodiments, the disclosure further provides an apparatus for controlling a camera module. The camera module is configured in an electronic device. The electronic device includes a body, a detecting component, a sliding component and a driving component. The driving component is configured to control the sliding component to slide between a first position received in the body and a second position exposed from the body. The detecting component includes a magnetic field generating element and a Hall element. The magnetic field generating element and the Hall element are respectively fixed on the sliding component and the body. The camera module is hard-wired to the sliding component. FIG. 11 is a block diagram of an apparatus for controlling a camera module according to embodiments of the disclosure. As illustrated in FIG. 11, the apparatus includes: a controlling module 1110, a sending module 1120 and a processing module 1130.

The controlling module 1110 is configured to drive the camera module to slide out to the second position by controlling the driving component to drive the sliding component, after receiving a face recognition request sent by a face recognition application.

The sending module 1120 is configured to send a delay recall instruction with a delay of a preset duration to the driving component based on a preset delay strategy, after acquiring a release request on the camera module from the face recognition application, to maintain the sliding component in the second position for the preset duration.

The processing module 1130 is configured to detect whether the face recognition request is obtained within the preset duration, and drive the camera module to slide into the first position by controlling the driving component to drive the sliding component after the preset duration in response that the face recognition request is not obtained.

Figure 12:
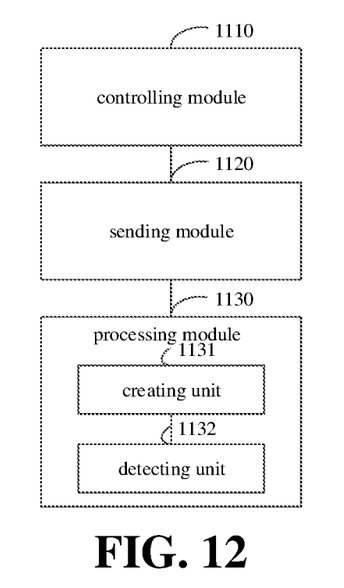
FIG. 12 is a block diagram of an apparatus for controlling a camera module according to embodiments of the disclosure.

In embodiments, as illustrated in FIG. 12, on the basis of FIG. 11, the processing module 1130 includes: a creating unit 1131 and a detecting unit 1132. The creating unit 1131 is configured to pre-create a counter for recording a request of the sliding component, wherein an initial value of the counter is 0, and after the face recognition request is obtained, the counter is incremented by one, and after the release request on the camera module is obtained, the counter is decremented by one.

The detecting unit 1132 is configured to detect whether a count value of the counter changes from 0 to 1 within the preset duration.

It should be noted that the description focused on the embodiments of the method for controlling the camera module is also applicable to the apparatus for controlling the camera module provided in the embodiments of the disclosure, and the details are not repeated herein.

In conclusion, with the apparatus for controlling the camera module provided in the embodiments of the disclosure, the influence of related components on the screen-to-body ratio may be reduced through the sliding component, and the loss of the sliding component is reduced. When there is a control request for the camera module in a short duration, the camera module is maintained in a sliding-out state to avoid multiple operations of related components in the short duration, and the flexibility and practicability are high.

In order to implement the above embodiments, the disclosure further provides an electronic device. As illustrated in FIGS. 1-4, the electronic device includes a body 10, a detecting component 30 and a driving component 50. The driving component 50 is configured to control the sliding component to drive the camera module 42 to slide between the first position received in the body and the second position exposed from the body. The detecting component includes a magnetic field generating element 32 and a Hall element 34. The magnetic field generating element 32 and the Hall element 34 are respectively fixed on the sliding component 20 and the body 10. The electronic device further includes: a memory 70, a processor electrically coupled to the sliding component, and a computer program stored on the memory 70 and for running on the processor 60. When the processor executes the program, the method for controlling the camera module according to the above embodiments is performed.

It should be noted that the electronic device described in the foregoing embodiments of the method for controlling the camera module is also applicable to the electronic device provided in the embodiments of the disclosure, and implementation details and technical effects are not repeated herein.

In order to implement the above embodiments, the embodiments of the disclosure provide a computer-readable storage medium on which a computer program is stored. When the program is executed by a processor, the method for controlling the camera module as described in the above method embodiments is performed.

Reference throughout this specification to "an embodiment," "some embodiments," "an example," "a specific example," or "some examples," means that a particular feature, structure, material, or characteristic described in connection with the embodiment or example is included in at least one embodiment or example of the disclosure. The appearances of the above phrases in various places throughout this specification are not necessarily referring to the same embodiment or example of the disclosure. Furthermore, the particular features, structures, materials, or characteristics may be combined in any suitable manner in one or more embodiments or examples.

Although the embodiments of the disclosure have been shown and described, those of ordinary skill in the art can understand that various changes, modifications, substitutions and modifications are made to these embodiments without departing from the principle and purpose of the disclosure. The scope of the disclosure is defined by the claims and the equivalents.

What is claimed is:

1. A method for controlling a camera module in an electronic device, wherein the camera module is removable between a first position received in a body of the electronic device and a second position exposed from the body, and the method comprises:
   driving the camera module to slide to the second position in response to receiving a first face recognition request;
   maintaining the camera module in the second position for a first duration in response to acquiring a release request on the camera module; and
   driving the camera module to slide to the first position in response to not receiving a second face recognition request within the first duration.

2. The method as claimed in claim 1, further comprising:
   returning the maintaining the camera module in the second position for the first duration in response to receiving the second face recognition request within the first duration.

3. The method as claimed in claim 1, wherein driving the camera module comprises:
   driving a sliding component hard-wired to the camera module by controlling a driving component in the electronic device, to drive the camera module.

4. The method as claimed in claim 2,
   wherein driving the camera module to slide to the first position in response to not receiving the second face recognition request within the first duration comprises: driving the camera module to slide to the first position in response to detecting that a count value of a counter maintains 0 within the first duration, in which an initial value of the counter is 0, and after the face recognition request is obtained, the counter is incremented by one, and after the release request on the camera module is obtained, the counter is decremented by one; or
   wherein returning the maintaining the camera module in the second position for the first duration in response to receiving the second face recognition request within the first duration comprises: returning the maintaining the camera module in the second position for the first duration in response to detecting that the count value of the counter changes from 0 to 1 within the first duration in which an initial value of the counter is 0, and after the face recognition request is obtained, the counter is incremented by one, and after the release request on the camera module is obtained, the counter is decremented by one.

5. The method as claimed in claim 1, further comprising:
   before driving the camera module to slide to the first position in response to not receiving the second face recognition request within the first duration,
   determining that an application currently running in a foreground of a system is not a face recognition application, or a screen of the electronic device is turned off.

6. The method as claimed in claim 5, further comprising:
   returning the maintaining the camera module in the second position for the first duration in response to determining that the application currently running in the foreground of the system is the face recognition application, and the screen of the electronic device is turned on.

7. The method as claimed in claim 5, further comprising:
   driving the camera module by a screen-locking application in response to the face recognition application being the screen-locking application.

8. The method as claimed in claim 1, wherein acquiring the release request on the camera module comprises:
   acquiring a face recognition success response; or,
   determining that a duration of occupying the camera module by an application sending the first face recognition request is more than a second duration after acquiring a face recognition success response or a face recognition failure response; or
   acquiring a number of times of receiving face recognition failure responses is more than a preset number of times.

9. An electronic device comprising:
   a body,
   a camera module removable between a first position received in the body and a second position exposed from the body,
   a memory,
   a processor electrically coupled to the memory, and
   a computer program stored on the memory and for running on the processor,
   in which the processor is configured to, execute the computer program on the memory to:
   drive the camera module to slide to the second position in response to receiving a first face recognition request;

maintain the camera module in the second position for a first duration in response to acquiring a release request on the camera module; and drive the camera module to slide to the first position in response to not receiving a second face recognition request within the first duration.

10. The electronic device as claimed in claim 9, wherein the processor is configured to, execute the computer program on the memory to:

maintain the camera module in the second position for the first duration in response to receiving the second face recognition request within the first duration.

11. The electronic device as claimed in claim 9, further comprising:

a sliding component hard-wired to the camera module; and a driving component, configured to drive the sliding component to drive the camera module, wherein the processor is configured to, execute the computer program on the memory to drive the camera module by:

driving the sliding component by controlling the driving component, to drive the camera module.

12. The electronic device as claimed in claim 10, wherein the processor is configured to, execute the computer program on the memory to:

drive the camera module to slide to the first position in response to detecting that a count value of a counter maintains 0 within the first duration, in which an initial value of the counter is 0, and after the face recognition request is obtained, the counter is incremented by one, and after the release request on the camera module is obtained, the counter is decremented by one; or maintain the camera module in the second position for the first duration in response to detecting that the count value of the counter changes from 0 to 1 within the first duration, in which an initial value of the counter is 0, and after the face recognition request is obtained, the counter is incremented by one, and after the release request on the camera module is obtained, the counter is decremented by one.

13. The electronic device as claimed in claim 9, wherein the processor is configured to, before driving the camera module to slide to the first position in response to not receiving the second face recognition request within the first duration, execute the computer program on the memory to:

determine that an application currently running in a foreground of a system is not a face recognition application, or a screen of the electronic device is turned off.

14. The electronic device as claimed in claim 13, wherein the processor is configured to, execute the computer program on the memory to:

maintain the camera module in the second position for the first duration in response to determining that the application currently running in the foreground of the system is the face recognition application, and the screen of the electronic device is turned on.

15. The electronic device as claimed in claim 9, wherein the processor is configured to, execute the computer program on the memory to acquire the release request on the camera module by any act of:

acquiring a face recognition success response; or, determining that a duration of occupying the camera module by an application sending the first face recognition request is more than a second duration after acquiring a face recognition success response or a face recognition failure response; or acquiring a number of times of receiving face recognition failure responses is more than a preset number of times.

16. A non-transitory computer-readable storage medium with a computer program stored thereon, wherein in response that the computer program is executed by a processor of an electronic device, the electronic device is caused to perform a method for controlling a camera module in the electronic device, in which the camera module is removable between a first position received in a body of the electronic device and a second position exposed from the body, and the method comprises:

driving the camera module to slide to the second position in response to receiving a first face recognition request;

maintaining the camera module in the second position for a first duration in response to acquiring a release request on the camera module; and driving the camera module to slide to the first position in response to not receiving a second face recognition request within the first duration.

17. The non-transitory computer-readable storage medium as claimed in claim 16, wherein the method further comprises:

returning the maintaining the camera module in the second position for the first duration in response to receiving the second face recognition request within the first duration.

18. The non-transitory computer-readable storage medium as claimed in claim 16, wherein driving the camera module comprising:

driving a sliding component hard-wired to the camera module by controlling a driving component in the electronic device, to drive the camera module.

19. The non-transitory computer-readable storage medium as claimed in claim 17, wherein driving the camera module to slide to the first position in response to not receiving the second face recognition request within the first duration comprises: driving the camera module to slide to the first position in response to detecting that a count value of a counter maintains 0 within the first duration, in which an initial value of the counter is 0, and after the face recognition request is obtained, the counter is incremented by one, and after the release request on the camera module is obtained, the counter is decremented by one; or wherein returning the maintaining the camera module in the second position for the first duration in response to receiving the second face recognition request within the first duration comprises: returning the maintaining the camera module in the second position for the first duration in response to detecting that the count value of the counter changes from 0 to 1 within the first duration, in which an initial value of the counter is 0, and after the face recognition request is obtained, the counter is incremented by one, and after the release request on the camera module is obtained, the counter is decremented by one.

20. The non-transitory computer-readable storage medium as claimed in claim 16, before driving the camera module to slide to the first position in response to not receiving the second face recognition request within the first duration, the method further comprises:

determining that an application currently running in a foreground of a system is not a face recognition application, or a screen of the electronic device is turned off.

* * * * *